(12) United States Patent
Le Ber et al.

(10) Patent No.: US 9,008,056 B2
(45) Date of Patent: Apr. 14, 2015

(54) REMOTE NETWORK ACCESS VIA A VISITED NETWORK

(75) Inventors: Erwan Le Ber, Lannion (FR); Philippe Hemon, Tregastel (FR)

(73) Assignee: Orange, Paris (FR)

( * ) Notice: Subject to any disclaimer, the term of this patent is extended or adjusted under 35 U.S.C. 154(b) by 1077 days.

(21) Appl. No.: 13/001,407

(22) PCT Filed: Jun. 23, 2009

(86) PCT No.: PCT/FR2009/051197
§ 371 (c)(1),
(2), (4) Date: Apr. 29, 2011

(87) PCT Pub. No.: WO2010/007289
PCT Pub. Date: Jan. 21, 2010

(65) Prior Publication Data
US 2011/0208863 A1    Aug. 25, 2011

(30) Foreign Application Priority Data
Jun. 24, 2008  (FR) .................................... 08 54186

(51) Int. Cl.
H04W 4/00      (2009.01)
H04L 29/06     (2006.01)
H04L 29/12     (2006.01)

(52) U.S. Cl.
CPC ........ H04L 63/101 (2013.01); H04L 29/12066 (2013.01); H04L 29/12594 (2013.01); H04L 29/12839 (2013.01); H04L 61/1511 (2013.01); H04L 61/304 (2013.01); H04L 61/6022 (2013.01); H04L 63/0272 (2013.01)

(58) Field of Classification Search
None
See application file for complete search history.

(56) References Cited

U.S. PATENT DOCUMENTS

| | | | |
|---|---|---|---|
| 2005/0240658 A1* | 10/2005 | Schulke ........................ | 709/217 |
| 2006/0114863 A1* | 6/2006 | Sanzgiri et al. ............... | 370/338 |
| 2006/0236388 A1 | 10/2006 | Ying et al. | |
| 2007/0081519 A1 | 4/2007 | Ramaswamy et al. | |
| 2007/0143488 A1 | 6/2007 | Pantalone | |
| 2007/0168458 A1 | 7/2007 | Costa-Requena et al. | |
| 2009/0022152 A1* | 1/2009 | Henry et al. .................. | 370/389 |
| 2009/0025079 A1* | 1/2009 | Tanizawa et al. ............... | 726/14 |
| 2010/0008507 A1* | 1/2010 | Galante et al. ................ | 380/278 |

OTHER PUBLICATIONS

Stapp et al., "Resolution of Fully Qualified Domain Name (FQDN) Conflicts among Dynamic Host Configuration Protocol (DHCP) Clients; RFC 4703," Internet Engineering Task Force, IETF, pp. 1-13 (Oct. 1, 2006).

* cited by examiner

Primary Examiner — Andrew Lai
Assistant Examiner — Leon Andrews
(74) Attorney, Agent, or Firm — Drinker Biddle & Reath LLP

(57) ABSTRACT

Remote access for a terminal to a first network via a second network is managed; the first network being linked to the second network via a network apparatus. At the level of the network apparatus, there is received, from the terminal via the second network, a request for remote access to the first network indicating access information comprising a first parameter corresponding to a physical address of the terminal and a second parameter corresponding to a secret key of the gateway. The network apparatus thereafter decides whether the terminal is authorized to remotely access the first network on the basis of said access information. This network apparatus subsequently emits, bound for the terminal via the second network, a message indicating whether the terminal is authorized to remotely access the first network.

8 Claims, 4 Drawing Sheets

REMOTE NETWORK ACCESS VIA A VISITED NETWORK

CROSS-REFERENCE TO RELATED APPLICATIONS

This application is the U.S. national phase of the International Patent Application No. PCT/FR2009/051197 filed Jun. 23, 2009, which claims the benefit of French Application No. 08 54186 filed Jun. 24, 2008, the entire content of which is incorporated herein by reference.

FIELD OF THE INVENTION

The present invention relates to the field of network access and more particularly of remote network access.

BACKGROUND

Residential networks, or else home networks, allow terminals to have access to services that are available in this network. It may be worthwhile to provide services of the home network to this same terminal when the latter is not located in the home network.

Certain network architectures allow this terminal to access its home network via a remote network. This type of architecture provides geographic flexibility for access to the home network for a terminal so that it can have the services concerned even though it is not located in this home network.

To allow a terminal located remotely from its home network to access a voice-over-IP service available in this home network, provision may be made to put in place a registration of the terminal with a server managed by an operator supplying the service in question. During this registration, the terminal retrieves configuration data on the basis of which it is then able to authenticate itself and to register in order to request a voice-over-IP call setup with a specific platform also managed by an operator.

In such a context, not only does access to the voice-over-IP service require the linking of the terminal with a server in the first place, then with a platform in the second place, but also it can be complicated to manage the voice-over-IP call on the platform in question in such an architecture.

The object of the present invention is to improve the situation.

SUMMARY

A first aspect of the present invention proposes a method for managing remote access for a terminal to a first network via a second network; said first network being connected to the second network via a network equipment; said method comprising the following steps applied at the network equipment:

/1/ receiving, from said terminal via the second network, a request for access to the first network indicating access information;

/2/ deciding whether the terminal is authorized to access the first network on the basis of said access information; and /3/ transmitting, to the terminal via the second network, a message indicating whether the terminal is authorized to access the first network, said method being noteworthy in that said access information comprises a first parameter corresponding to a physical address of the terminal and a second parameter corresponding to a secret key of the gateway.

Proceeding in this way, it is possible to provide a terminal with remote access to a network on which it is already registered, via another network, in a simple and effective manner, since the access information which the terminal and the network equipment require to authorize remote access to the first network according to the invention is conventionally retrieved when this terminal is registered with the first network.

Provision can made for the prior registration of the terminal with the network equipment to be carried out according to an SIP (for Session Initiation Protocol) protocol.

By virtue of such arrangements, the terminal can easily obtain access information on the basis of which it can remotely access the services available in the first network, that is to say the network with which it is already registered.

Moreover, this remote access is protected on the basis of said access information.

In such an architecture, the remote access authorization can be carried out in a simple and effective manner.

In one embodiment of the present invention, the network equipment provides a service in the first network, and also provides said service via the second network to the terminal that is authorized to remotely access the first network.

In this instance, the network equipment from which the terminal requires a remote access authorization to the first network also corresponds to the equipment that provides the service in the first network. The result of this is that the terminal, once authorized to access the first network via a second network, can use the service remotely in conditions similar to those that it would have if it was situated in the first network, locally.

The first network may correspond to a home network and the network equipment considered here may correspond to a home gateway. However, no limitation is attached to the features of this first network or to those of the gateway. Therefore, it is also possible to make provision in particular for the first network to correspond to an enterprise network. The gateway is then suitable for connecting a public network to this enterprise network.

Therefore, by virtue of these arrangements, the provision of access information allowing a terminal remote access to the first network, the remote access control of this terminal during an attempt to access the first network via the second network and the provision of the service are carried out in one and the same network equipment in the first network, according to one embodiment of the present invention.

These features make it possible to simplify both the architecture and the application of such a management method. Specifically, the terminal is finally connected to the same network equipment, whether it has accessed the first network locally or whether it has remote access according to one embodiment of the present invention.

Therefore, providing the intended service to the terminal which is in its home network, that is to say the first network for which the terminal has local access and with which it has already registered, or else to the terminal that is in a remote network, can advantageously be managed in a similar manner in the network equipment considered according to one embodiment of the present invention.

The service considered may correspond to a voice-over-IP communication. In this case, the network equipment sets up a VoIP communication according to the SIP (for Session Initiation Protocol) protocol for the terminal authorized to remotely access the first network.

In this instance, a VoIP communication can therefore be set up both remotely and locally according to the same principles.

The network equipment can manage a list linking respective items of access information to each registered terminal. In this case, in step 2, the network equipment can decide that the terminal is authorized to access the first network when the access information indicated in the remote access request corresponds to the access information associated with said terminal in said list.

The access information has been exchanged during a local registration of the terminal with the network equipment. Therefore, such a list management on the network equipment makes it possible to ensure a level of remote access security with respect to the first network.

The access information associated with a terminal may include a first parameter indicating an MAC (for Medium Access Control) address of said terminal and a second parameter indicating a WEP (for Wired Equivalent Privacy) key of the network equipment. This type of first parameter received from the terminal by the network equipment at the time of local registration of the terminal advantageously corresponds to an authentication parameter making it possible to protect the remote access to the first network.

In one embodiment of the present invention, the MAC address of the terminal is stored in the network equipment during the first registration with the latter. Provision may be made for the terminal to receive the WEP key at the time of a manual operation carried out on the terminal for example by the user.

Specifically, this information may correspond to a configuration parameter of the terminal provided by the user during his first access, for example WiFi. However, no limitation is attached to the means used to inform the terminal of this WEP key of the network equipment in question. It is also possible to envisage that this information is received from another equipment.

It should be noted that the terminal, when it is not situated in the first network, wishes to obtain an address in order to contact the equipment of the first network. In order to be able to obtain this address, the terminal may use any mechanism and no limitation is attached to the present invention with respect to the mechanism used for this purpose.

It is possible in particular to provide for the network equipment to register with a DNS (for Domain Name System) server by transmitting a registration request indicating at least one MAC address of the network equipment.

In one embodiment, such a registration request, from the network equipment in question, from a DNS server indicates a domain name which is representative of the service consisting in providing remote access to a terminal. This domain name also includes a field indicating the MAC address of the network equipment. In a such a context, the DNS server can easily redirect such registration requests to a dedicated server on the basis of the domain name, as a function of the MAC address indicated in the first field. This dedicated server then links the IP address of the network equipment to its MAC address.

Therefore, the DNS server in question is capable of managing a link between an IP address and an MAC address of each network equipment registered with it. Proceeding in this way, the terminal which has the MAC address of the network equipment is capable of subsequently obtaining the IP address of this equipment on the principle of an address resolution of the DNS type on the basis of the use of this DNS server.

A second aspect of the present invention proposes a method comprising the following steps applied at the terminal:

/1/ transmitting, to the network equipment via the second network, a remote access request indicating the access information; and /2/ receiving, from the network equipment via the second network, a message indicating whether the terminal is authorized to remotely access the first network.

By virtue of these arrangements, the terminal already registered with the network equipment of the first network can have remote access to this first network via a second network.

Provision can be made for the access information to include a first parameter indicating an MAC address of said terminal and a second parameter indicating a WEP key of the network equipment.

In order to be able to contact the network equipment remotely, the terminal knows an address of this network equipment. Therefore, for example, if the second network is an IP network, the terminal wishing to request remote access to the first network knows the IP address of the network equipment.

The present invention covers all the mechanisms allowing the terminal to obtain an address of the network equipment of the first network accessible via the second network.

It is possible, for example, to provide for the terminal to know an MAC address of the network equipment and, before step 1, for the following steps to be applied at the terminal:

/i/ transmitting to a DNS platform an address request indicating an MAC address of the network equipment;

/ii/ receiving a response indicating an IP address of the network equipment.

In one embodiment of the present invention, it is possible to provide that, based on this DNS platform, a link between an IP address and an MAC address of the network equipment in question is accessible. In this context, the terminal retrieves the IP address of the network equipment in question on the basis of the MAC address of this equipment from this DNS platform.

More precisely, the terminal can know a domain name which is associated with the remote access service in one embodiment of the present invention. This domain name can be known to the terminal at the time of the first connection, to the network equipment, made in the first network, locally, by using a DHCP (for Dynamic Host Configuration Protocol) option. No limitation is attached to the present invention with respect to the method used for the terminal to know the corresponding domain name.

Therefore, in step i, the terminal can transmit an address request which indicates the domain name in question and the MAC address of the network equipment sought. Proceeding in this way, it is possible, on the DNS platform, to transfer this type of request to one or more servers dedicated to address management for this remote access service according to one embodiment of the present invention.

It should be noted that, in an architecture according to one embodiment of the present invention, it is possible to provide advantageously a protected remote access to the first network via the second network without any adaptation being made in this second network. The provision of this remote protected access is therefore easy to make.

A third aspect of the present invention proposes a network equipment suitable for applying a remote access management method according to the first aspect of the present invention.

A fourth aspect of the present invention proposes a terminal suitable for applying a remote access management method according to the second aspect of the present invention.

A fifth aspect of the present invention proposes a system for managing remote access to a first network via a second network for a terminal according to the fourth aspect of the present invention, a network equipment according to the third aspect of the present invention connecting the first network to the second network.

A sixth aspect of the present invention proposes a computer program designed to be stored in a memory of a network equipment according to the third aspect of the present invention, or on a removable memory medium and designed to interact with a drive of said network equipment, said computer program comprising instructions for applying all or some of the steps of the method according to the first aspect of the present invention.

A seventh aspect of the present invention proposes a computer program designed to be stored in a memory of a terminal according to the fourth aspect of the present invention, or on a removable memory medium and designed to interact with a drive of said terminal, said computer program comprising instructions for applying all or some of the steps of the method according to the second aspect of the present invention.

Other aspects, objects and advantages of the invention will appear on reading the description of one of its embodiments.

BRIEF DESCRIPTION OF THE DRAWINGS

The invention will also be better understood with the aid of the drawings, in which.

DETAILED DESCRIPTION

Figure 1:
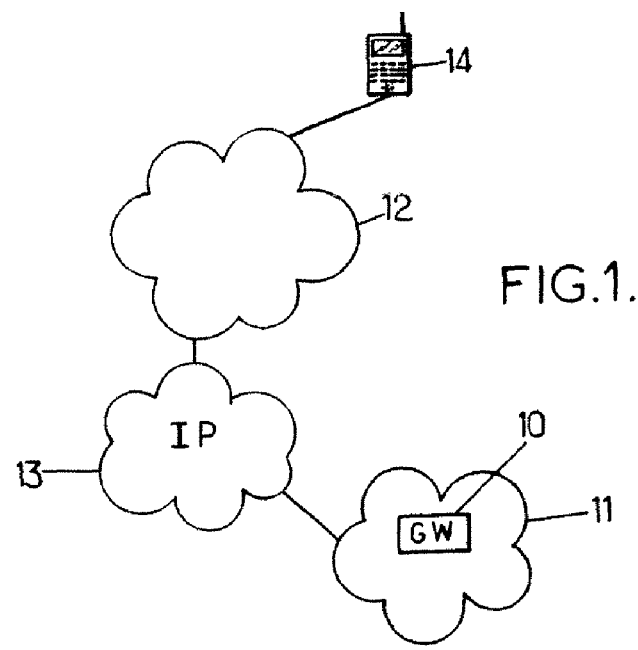
FIG. 1 illustrates a network architecture according to one embodiment of the present invention.

FIG. 1 illustrates a network architecture according to one embodiment of the present invention. A first network 11 comprises a network equipment 10. This first network may, for example, be a home network or else an enterprise network. This network equipment 10 hereinafter corresponds to a gateway 10. This gateway is suitable for providing a service in this first network 11 in a local manner to terminals belonging to this first network. It is also suitable for connecting this first network 11 to an outside network, a second network 13. As an illustration, the second network 13 is an IP network.

No limitation is attached to the method used by the terminal 14 for connecting itself to the IP network 13. As illustrated in this FIG. 1, it is possible to provide for the terminal 14 to be connected to the IP network 13 via another home network 12, or else via any point of access to the network 13. It is also possible to provide for the network 12 to be a network of the cellular network type.

A terminal 14 is a terminal belonging to the first network 11. "Terminal belonging to a network" in this instance means a terminal which can access this network locally and receive services provided in this network. Usually, a terminal is registered with this network beforehand. The terminal 14 is therefore in this instance already registered in the first network in order to locally obtain services provided in this network.

According to one embodiment of the present invention, the terminal 14 may have access to the first network 11 via the second network 13.

No limitation is attached to the type of the terminal with respect to the present invention. Therefore, the terminal 14 may, for example, be a WiFi SIP terminal, and in this case it can access the first network 11 remotely via a WiFi access point, or else a bi-mode terminal having at the same time the features of a WiFi SIP terminal and those of a GSM terminal, and in this case, the terminal 14 can remotely access the network 11 by connecting itself to the network 12 which can be a network of the GSM type, and then via the IP network 13.

Figure 2:
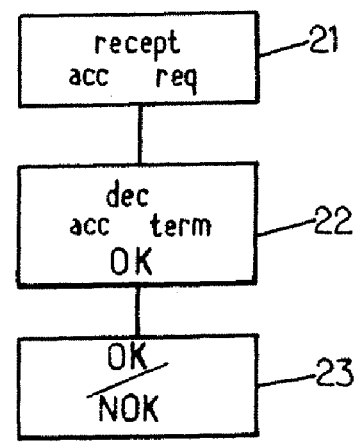
FIG. 2 illustrates the main steps of a remote access management method according to one embodiment of the invention.

FIG. 2 illustrates the main steps of the remote access management method according to one embodiment of the present invention. At this stage, the terminal has already been registered with the network 11 locally. It therefore belongs to this first network 11 and, as such, can receive services provided in this network when it is locally connected to this first network 11. During this prior registration with the gateway 10, the terminal supplies, or updates, access information which will allow it, if necessary later, to access the first network remotely according to one embodiment of the present invention.

In a step 21, the network equipment 10, or gateway, receives a message requesting remote access to the first network from the terminal via the second network, indicating the access information.

In a step 22, the network equipment 10 decides whether the terminal is authorized to remotely access the first network on the basis of the access information indicated in the access request.

More precisely, for this purpose, each terminal of the first network, wishing to be able to remotely access this same network subsequently, may provide access information during its local registration with the gateway 10. Provision can be made for this transmission of access information between the terminal 14 and the gateway 10 to take place at the time of any local registration or for it to take place only during a specific registration which requires possible subsequent remote use of the first network.

In the latter case, the gateway could manage two types of registration, a first type of registration which corresponds to a local registration and a second type of registration which corresponds to both a local and a remote registration.

More precisely, during this second type of registration, in one embodiment, the items of access information transmitted from the terminal to the gateway are a first item of information corresponding to a physical address of the terminal and a second item of information corresponding to a secret key of the gateway. These first and second items of information may respectively be an MAC address of the terminal and a key of the WEP (for Wired Equivalent Privacy) key type of the gateway. However, no limitation is attached to the type of these items of access information with respect to the present invention.

It is possible to make provision to manually configure the WEP key on the terminal.

These items of access information are respectively stored both on the terminal and on the gateway so as to be able to be accessed subsequently by these two elements. The gateway 10 can therefore maintain a linking list in which the items of access information relating to a terminal are stored in association with this terminal. This list remains accessible by the gateway in order to allow it subsequently, during a request for remote access to the first network, to verify whether this terminal can be authorized to make this access. Specifically, on one side, the remote access request indicates these items of access information and, on the other side, these items of information can be accessed via the list.

Proceeding in this way ensures a high level of protection with respect to the remote use of the first network.

Then, in a step 23, the gateway informs the terminal of its decision to accept or not its request for remote access to the first network. Accordingly, it transmits a message indicating this decision.

Hereinafter, the present invention is described in its application to home networks and to the voice-over-IP, or VoIP, service provided in such a network. This application is merely illustrative and in no way limits the use of the present invention in the context of other applications.

In this context, the first network 11 provides, via the gateway 10, a voice-over-IP call service. Consequently, a terminal belonging to this first network 11 and situated locally in this first network can request from the gateway the setup of a voice-over-IP call with the gateway 10.

According to one embodiment, provision is also made to provide such a voice-over-IP call service to the terminal 14 which is situated remote from the first network and which has access to this first network 11 via the second network 13.

Figure 3:
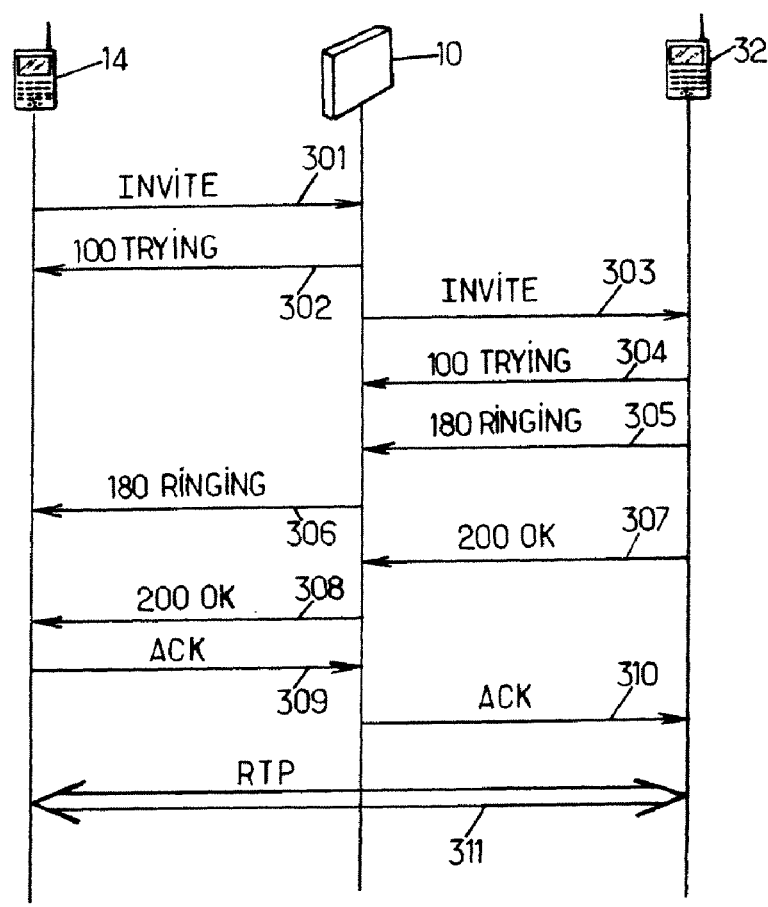
FIG. 3 illustrates a protocol interchange for setting up a voice-over-IP communication in an architecture according to one embodiment of the present invention.

FIG. 3 illustrates a protocol interchange according to the SIP protocol of a voice-over-IP call setup in such a context. This protocol interchange is used after steps 21 to 23 have been carried out and the remote access of the terminal 14 to the first network 11 has been accepted. At this stage, the terminal located in the second network 13 can obtain services available in the first network.

In the illustrative context of the network architecture as illustrated by FIG. 1, the messages interchanged between the terminal 14 and the network entity 10 in this instance pass via the network 12 and then via the second IP network 13 before reaching the gateway 10, and vice versa in the reverse direction of transmission.

Therefore, the terminal having received a positive response to its remote access request to the first network from the gateway 10 can then transmit a call initiation message to the gateway, an "INVITE" message 301 according to the SIP protocol. On receipt of this "INVITE" message 301, the gateway 10 transmits on the one hand to the terminal 14, the calling terminal, a "100 TRYING" message 302 according to the SIP protocol, and, on the other hand, to a called terminal 32 an "INVITE" message 303 according to the SIP protocol. The message 302 corresponds to a response to the message 301 from the calling terminal 14 and the message 303 corresponds to the transmission of the message 301 to the called terminal 32.

The called terminal 32 responds to the "INVITE" message 303 by sending a "100 TRYING" message 304 according to the SIP protocol. It then transmits a "180 RINGING" message 305 according to the SIP protocol. This message 305 is received by the gateway 10 and then transmitted to the calling terminal 14 in the form of a message 306.

Then, when the call being set up is replied to at the called terminal 32, the latter transmits a "200 OK" message 307 according to the SIP protocol.

This message 307 is then transmitted in the form of a "200 OK" message 308 from the gateway 10 to the calling terminal 14. The latter then acknowledges safe receipt of this response to the current call by transmitting an "ACK" message 309 according to the SIP protocol. This message is then relayed to the called terminal 32 in the form of an "ACK" message 310.

At this stage, a VoIP communication 311 is set up between the calling terminal 14 and the called terminal 32 according to the RTP (for Real Time Protocol) protocol.

It should be noted that the stream of SIP signaling messages preceding the setup of the communication 311 therefore passes through the gateway 10.

On the other hand, the data, or media streams, passing through during the set-up communication 311, do not necessarily pass through the gateway 10, and can be transmitted directly between the terminals 14 and 32. Specifically, the destination address of the media streams in the communication 311 is not modified according to one embodiment of the present invention.

It is easy to deduce sections that precede a protocol interchange corresponding to the fact that the terminal 14 receives a VoIP call from the first network while it has remote access to this first network.

By virtue of these arrangements, a user can receive on a roaming VoIP terminal, that is to say a terminal situated outside its home network in which it is registered, a call initially directed to a fixed VoIP number of the first network 11, while the VoIP terminal is not directly connected locally to the gateway 10.

It should therefore be noted that using the service locally or remotely is similar and is still managed by the gateway 10.

When the terminal is connected to the second network 13 via a WiFi internet access point, for example, it is a requirement that this terminal have an address allowing it to transmit messages to the gateway 10.

No limitation is attached to the present invention with respect to the mechanism used to retrieve this address.

Accordingly, for example, it is possible to provide for using a specific IP address resolution mechanism, of the DNS (for Domain Name System) type.

Figure 4:
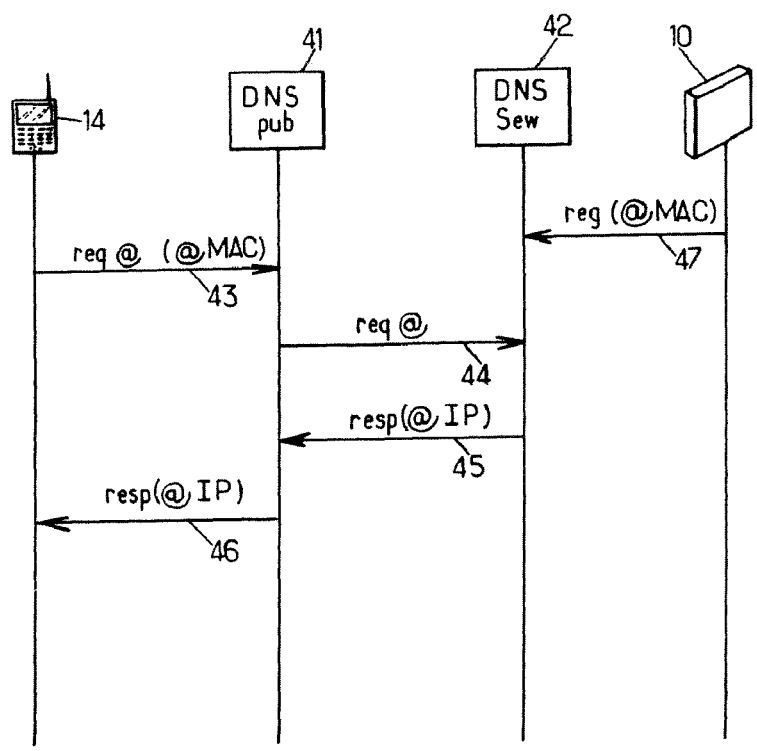
FIG. 4 illustrates a message interchange applied according to one embodiment of the present invention in order to obtain an address of the network equipment at a terminal.

FIG. 4 illustrates an interchange of messages which relate to obtaining an address of the gateway 10 at the terminal 14, when the latter is no longer located in the first network.

A public IP address resolution DNS platform 41 is accessible to the terminal 14 via the IP network 13. The terminal 14 then transmits an address request 43 to the DNS platform 41. Said address request 43 may indicate to the DNS platform a domain name in which an MAC address of the gateway 10 is included, this information having been, for example, retrieved during the prior registration of the terminal 14 in the first network which was carried out when the terminal was located in this first network.

The terminal 14 therefore transmits an address request 43 indicating the MAC address of the gateway 10 within the domain name. In one embodiment of the present invention, the DNS platform 41 routes this type of request which indicates this domain name to a dedicated DNS server. Therefore, on receipt of the request message 43, the DNS platform 41 transmits this message in the form of an address request message 44 to a DNS server 42.

This DNS server 42 has access to an MAC address and IP address association list for the gateways that have registered with it. Therefore, provision is made for the gateway 10 to be already registered with the DNS server 42 by transmitting to it a registration message 47 indicating its MAC address and its IP address.

Consequently, the DNS server 42 can respond to the message 43 by the transmission of a "resp(@IP)" message 46 which indicates to the terminal the IP address that it can use for transmitting messages to the gateway 10.

Then, steps 21 to 23 can be applied according to one embodiment of the present invention.

More precisely, the mechanisms of the DNS type propose an option of redirecting the requests originating from a determined domain to a DNS server. In this instance, provision can be made for the address requests 43 transmitted by a terminal 14 that is remote from the first network 11 to indicate a specific domain, for example the domain sip.service.com. In this context, the option can advantageously be used so as to transfer all the address requests indicating a domain mac.sip.service.com to a DNS server dedicated to this service such as the DNS server 42.

Such a DNS server knows the MAC address and the IP address of each gateway (or Home Gateway) which is registered for the remote access service according to one embodiment of the present invention.

By virtue of the arrangements of the present invention, the network architecture making it possible to provide a home network service by remote access is simple and can be applied at low cost. Moreover, it requires no modification in the network outside the home network, or first network.

These features allow a subscriber to receive the calls directed to a fixed VoIP number of the home network 11 while being located elsewhere, and even while traveling. This is the case in particular when the terminal 14 is a WiFi terminal.

Reciprocally, this subscriber can also set up calls by using a fixed VoIP number although he is not physically present in his home network.

A subscriber of this type can also call a terminal of his home network, therefore his home, in a manner similar to a call made within the home network. Such a call may therefore be free.

It should be noted that an architecture according to one embodiment of the present invention makes it possible to have the fixed communication offers and the mobile communication offers converge without requiring a modification of the mobile network in question.

Figure 5:
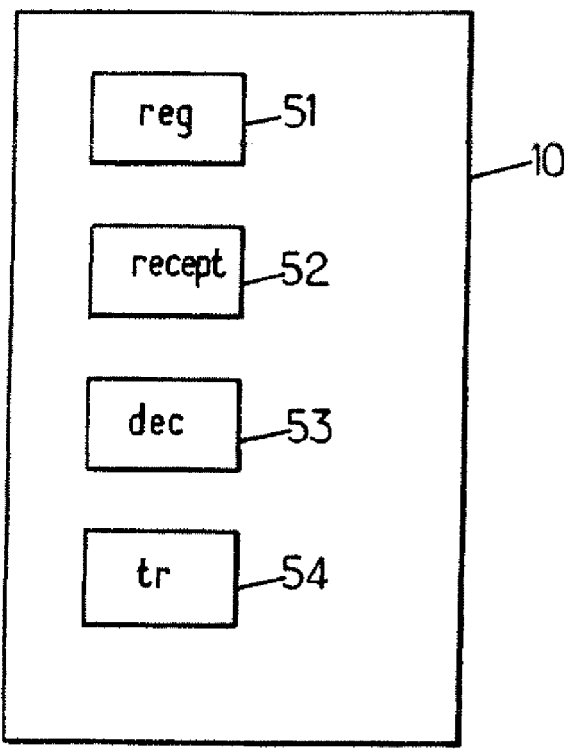
FIG. 5 illustrates an architecture of a network equipment according to one embodiment of the present invention.
Figure 5:
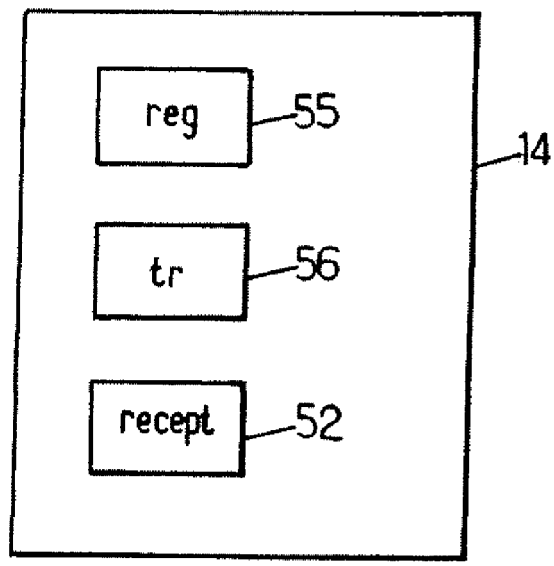

FIG. 5 illustrates an architecture of a network equipment 10 and of a terminal 14 according to one embodiment of the present invention.

Such a network equipment may comprise:
a registration unit 51 suitable for registering a physical address of the terminal when said terminal is in the first network;
a reception unit 52 suitable for receiving, from said terminal via the second network, an access request indicating said access information;
a decision unit 53 suitable for deciding whether the terminal is authorized to access the first network on the basis of said access information; and
a transmission unit 54 suitable for transmitting, to the terminal via the second network, a message indicating whether the terminal is authorized to access the first network,
said access information including a first parameter corresponding to said physical address of the terminal and a second parameter corresponding to a secret key of the gateway.

It may also comprise means suitable for managing a list associating respective items of access information with each registered terminal; the decision unit 53 then deciding that the terminal is authorized to access the first network when the items of access information indicated in the remote access request correspond to the items of access information associated with said terminal in said list.

Moreover, the registration unit 51 may be suitable for receiving an item of access information from the terminal 14 corresponding to an MAC address of the terminal.

The terminal 14 may comprise:
a registration unit 55 suitable for registering the terminal with the network equipment when the terminal is in the first network, by providing an MAC address of the terminal;
a transmission unit 56 suitable for transmitting, to the network equipment via the second network, a remote access request 31 indicating said access information; and
a reception unit 57 suitable for receiving, from the network equipment via the second network, a message indicating whether the terminal is authorized to access the first network remotely.

The transmission unit 56 may also be suitable for transmitting to a DNS server 41 an address request 43 indicating the MAC address of the network equipment 10; and the reception unit may be suitable for receiving a response 46 indicating an IP address of the network equipment.

The invention claimed is:

1. A remote access management method for managing remote access for a terminal to a first network via a second network; said first network being connected to the second network via a network equipment functioning as a gateway, said network equipment managing a list linking respective items of access information to each registered terminal;
said method comprising the following steps applied at the network equipment:
receiving, from the terminal via the second network, a request for remote access to the first network indicating access information;
deciding that the terminal is authorized to remotely access the first network when the access information indicated in the remote access request corresponds to the access information associated with said terminal in said list; and
transmitting, to the terminal via the second network, a message indicating whether the terminal is authorized to remotely access the first network, wherein said access information comprises a first parameter corresponding to a Media Access Control (MAC) address of the terminal and a second parameter corresponding to a secret key of the network equipment, and
wherein the network equipment registers with a Domain Name System (DNS) server by transmitting a registration request indicating a MAC address of the network equipment.

2. The remote access management method as claimed in claim 1, wherein the network equipment provides a service in the first network, and provides said service via the second network to the terminal authorized to remotely access the first network.

3. A remote access management method for managing remote access for a terminal to a first network via a second network; said first network being connected to the second network via a network equipment functioning as a gateway, said network equipment managing a list linking respective items of access information to each registered terminal, wherein the terminal has a Media Access Control (MAC) address of the network equipment;
said method comprising the following steps applied at the terminal:
transmitting to a Domain Name System (DNS) platform an address request indicating the MAC address of the network equipment;
receiving a response indicating an IP address of the network equipment;

transmitting, to the network equipment via the second network, a remote access request indicating access information; and receiving, from the network equipment via the second network, a message indicating whether the terminal is authorized to remotely access the first network, the network equipment deciding that the terminal is authorized to access the first network when the access information indicated in the remote access request corresponds to the access information associated with said terminal in said list;

wherein said access information includes a first parameter corresponding to a MAC address of the terminal and a second parameter corresponding to a secret key of the network equipment.

4. A network equipment functioning as a gateway in a system for managing remote access for a terminal to a first network via a second network;

said network equipment connecting said first network to the second network;

said network equipment comprising:

a manager for managing a list linking respective items of access information to each registered terminal;

a registration unit suitable for registering a Media Access Control (MAC) address of the terminal when said terminal is in the first network and for registering with a Domain Name System (DNS) server by transmitting a registration request indicating a MAC address of the network equipment;

a reception unit that receives, from said terminal via the second network, an access request indicating access information;

a decision unit decides that the terminal is authorized to access the first network when the items of access information indicated in the remote access request correspond to the items of access information associated with said terminal in said list; and a transmission unit that transmits, to the terminal via the second network, a message indicating whether the terminal is authorized to access the first network, wherein said access information includes a first parameter corresponding to said MAC address of the terminal and a second parameter corresponding to a secret key of the network equipment.

5. A terminal in a system for managing remote access to a first network via a second network;

said first network being connected to the second network via a network equipment functioning as a gateway, said network equipment managing a list linking respective items of access information to each registered terminal, wherein the terminal has a Media Access Control (MAC) address of the network equipment;

the terminal comprising:

a registration unit that registers the terminal with the network equipment when the terminal is in the first network, and provides said network equipment with a MAC address of the terminal;

a first transmission unit that transmits to a Domain Name System (DNS) platform an address request indicating the MAC address of the network equipment;

a first reception unit that receives a response indicating an IP address of the network equipment;

a second transmission unit that transmits, to the network equipment via the second network, a remote access request indicating access information; and a second reception unit that receives, from the network equipment via the second network, a message indicating whether the terminal is authorized to access the first network remotely, the network equipment deciding that the terminal is authorized to access the first network when the access information indicated in the remote access request corresponds to the access information associated with said terminal in said list;

wherein said access information includes a first parameter corresponding to said MAC address of the terminal and a second parameter corresponding to a secret key of the gateway.

6. A system for managing remote access to a first network via a second network for a terminal, the system comprising:

the terminal; and a network equipment that functions as a gateway and manages a list that links respective items of access information to each registered terminal;

said first network being connected to the second network via the network equipment;

said network equipment comprising:

a registration unit suitable for registering a physical address of the terminal when said terminal is in the first network;

a reception unit that receives, from said terminal via the second network, an access request indicating access information;

a decision unit that decides whether the terminal is authorized to access the first network on the basis of said access information; and a transmission unit that transmits, to the terminal via the second network, a message indicating whether the terminal is authorized to access the first network, wherein said access information includes a first parameter corresponding to said physical address of the terminal and a second parameter corresponding to a secret key of the network equipment;

wherein the terminal has a Media Access Control (MAC) address of the network equipment, the terminal comprising:

a registration unit that registers the terminal with the network equipment when the terminal is in the first network, and provides said network equipment with a MAC address of the terminal;

a first transmission unit that transmits to a Domain Name System (DNS) platform an address request indicating the MAC address of the network equipment;

a first reception unit that receives a response indicating an IP address of the network equipment;

a second transmission unit that transmits, to the network equipment via the second network, a remote access request indicating access information; and a second reception unit that receives, from the network equipment via the second network, a message indicating whether the terminal is authorized to access the first network remotely, the network equipment deciding that the terminal is authorized to access the first network when the access information indicated in the remote access request corresponds to the access information associated with said terminal in said list;

wherein said access information includes a first parameter corresponding to said MAC address of the terminal and a second parameter corresponding to a secret key of the gateway.

7. A non-transitory computer readable storage medium, storing computer instructions to perform the remote access management method of claim 1.

8. A non-transitory computer readable storage medium, storing computer instructions to perform the remote access management method of claim 3.

\* \* \* \* \*